US012770895B2

(12) United States Patent
Senf et al.

(10) Patent No.: US 12,770,895 B2
(45) Date of Patent: Oct. 20, 2026

(54) SEPARATOR PLATE FOR AN ELECTROCHEMICAL SYSTEM

(71) Applicant: Reinz-Dichtungs-GmbH, Neu-Ulm (DE)

(72) Inventors: Felix Senf, Ulm (DE); Christian Luksch, Illertissen (DE); Andre Speidel, Bussmanshausen (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 623 days.

(21) Appl. No.: 18/447,181

(22) Filed: Aug. 9, 2023

(65) Prior Publication Data

US 2024/0055619 A1 Feb. 15, 2024

(30) Foreign Application Priority Data

Aug. 10, 2022 (DE) ..................... 20 2022 104 559.3

(51) Int. Cl.

| | |
|---|---|
| ***H01M 8/0258*** | (2016.01) |
| ***C25B 9/77*** | (2021.01) |
| ***C25B 13/02*** | (2006.01) |
| ***H01M 8/0206*** | (2016.01) |
| ***H01M 8/0254*** | (2016.01) |
| ***H01M 8/10*** | (2016.01) |
| ***H01M 8/18*** | (2006.01) |

(52) U.S. Cl.

CPC ............. *H01M 8/0258* (2013.01); *C25B 9/77* (2021.01); *C25B 13/02* (2013.01); *H01M 8/0254* (2013.01); *H01M 8/188* (2013.01); *H01M 8/0206* (2013.01); *H01M 2008/1095* (2013.01)

(58) Field of Classification Search

None

See application file for complete search history.

(56) References Cited

U.S. PATENT DOCUMENTS

2006/0222457 A1* 10/2006 Becker ................. B23K 26/702 219/121.64
2018/0241049 A1* 8/2018 Gruenwald ......... H01M 8/0247

FOREIGN PATENT DOCUMENTS

DE 10221951 A1 12/2003
DE 202012102318 U1 * 7/2012 ............. B23K 26/32
DE 202015104300 U1 8/2016

(Continued)

OTHER PUBLICATIONS

Machine Translation of DE-202012102318-U1 (Year: 2012).*
Machine Translation of WO-2020084120-A1 (Year: 2020).*

*Primary Examiner* — Gregg Cantelmo
(74) *Attorney, Agent, or Firm* — McCoy Russell LLP

(57) ABSTRACT

A separator plate for an electrochemical system comprising a first individual plate which comprises two first channels for conducting media which run next to one another and which are separated from one another at least in sections by a web formed between the first channels. The web comprising a lowered portion and a rear side of the base of the lowered portion is connected to a rear side of the base of the second channel in the contact zone of the individual plates via a welded connection. The welded connection comprises a first end region and a first curved portion, wherein the first curved portion runs, and is curved, in such a way that a virtual straight line running perpendicularly through the first end region intersects the welded connection at least two times.

19 Claims, 10 Drawing Sheets

(56) References Cited

FOREIGN PATENT DOCUMENTS

| | | | | | |
|---|---|---|---|---|---|
| DE | 102017202552 | A1 | | 8/2018 | |
| WO | WO-2020084120 | A1 | * | 4/2020 | ........ H01M 10/6568 |

* cited by examiner

SEPARATOR PLATE FOR AN ELECTROCHEMICAL SYSTEM

CROSS-REFERENCE TO RELATED APPLICATION

The present application claims priority to German Utility Model Application No. 20 2022 104 559.3, entitled "SEPARATOR PLATE FOR AN ELECTROCHEMICAL SYSTEM", and filed Aug. 10, 2022. The entire contents of the above-listed application is hereby incorporated by reference for all purposes.

TECHNICAL FIELD

The present disclosure relates to a separator plate for an electrochemical system and to an electrochemical system comprising such a separator plate.

BACKGROUND AND SUMMARY

Known electrochemical systems, for example fuel cell systems or electrochemical compressor systems, redox flow batteries and electrolyzers, usually comprise a plurality of separator plates which are arranged in a stack, such that in each case two adjacent separator plates enclose an electrochemical cell. The separator plates usually each comprise two individual plates which are connected to one another along their rear sides facing away from the electrochemical cells. The separator plates can be used, for example, for electrically contacting the electrodes of the individual electrochemical cells (e.g. fuel cells) and/or for electrically connecting adjacent cells (series connection of the cells). In the case of fuel cells, bipolar plates are often used as separator plates.

The individual plates of the separator plates may comprise channel structures for supplying the cells with one or more media and/or for transporting away media. The media may for example be fuels (e.g. hydrogen or methanol), reaction gases (e.g. air or oxygen) or a coolant as fed media and reaction products and heated coolant as discharged media. Furthermore, the separator plates may serve for transferring the waste heat produced in the electrochemical cell, as is produced for instance during the conversion of electrical or chemical energy in a fuel cell, and may be configured to seal the various media channels or cooling channels in relation to one another and/or towards the outside. In the case of fuel cells, the reaction media, e.g. fuel and reaction gases, are normally conducted on the mutually averted surfaces of the individual plates, while the coolant is conducted between the individual plates. The electrochemical cells of a fuel cell may for example each comprise a membrane electrode assembly (or MEA) with a respective polymer electrolyte membrane (PEM) and electrodes. The MEA may also comprise one or more gas diffusion layers (GDL) which are normally oriented towards the separator plates, for example towards bipolar plates of fuel cell systems, and are for example in the form of a carbon nonwoven.

The construction and the function of the individual plates often require the channels of the individual plates of the same separator plate to run in a crossed manner relative to one another at least in certain regions, such that the rear sides of the channel bases can be brought into contact and connected only in the crossing regions, in some embodiments. If the individual plates are connected in the region of the crossing channels, such an arrangement thus places high demands on the accuracy of the positioning of the individual plates relative to one another and on the positioning of the instrument provided for forming the connection relative to the individual plates. Conventional methods for connecting the individual plates to one another are, for example, welding, such as laser welding, soldering or adhesive bonding. If the required accuracy of the positioning is not observed when connecting the individual plates, the offset causes the connections to be too weak or to be entirely absent at least in part. For instance, the pressure of the coolant conducted between the individual plates may then result in tearing of the connections, these tearing open for example between the plates or for example a weld plug being torn from one or both individual plates, such that a hole is produced at least in one plate. In addition or as an alternative, the offset may also result in an excessive amount of energy being introduced into a point of an individual plate and burning through the latter, such that a hole is likewise produced. The individual plates may thus be damaged along the connecting locations to the point of becoming unusable. This may have the effect that the electrochemical cells enclosed between adjacent separator plates are flooded with a cooling liquid which is conducted between the individual plates and which passes through the individual plates due to the tears in the individual plates. A direct uncontrolled reaction between the reaction media may also occur if both individual plates comprise holes. Both can result in failure of the entire stack. The methods used hitherto for connecting the individual plates in regions in which the channels of the individual plates run in a crossed manner can therefore entail a high number of rejects in production or a short service life of the system in operation.

The present disclosure is thus based on the object of providing a separator plate for an electrochemical system, said separator plate being as stable as possible even in a region in which the channels of the individual plates of the separator plate run in a crossed manner relative to one another and being able to be produced with the lowest possible number of rejects.

This object is achieved by means of a separator plate for an electrochemical system and an electrochemical system according to the independent claims. Special configurations are described in the dependent claims and the following description.

Correspondingly, a separator plate for an electrochemical system is proposed. The separator plate comprises a first individual plate and a second individual plate which is connected to the first individual plate, wherein the two individual plates contact one another in a contact zone.

The first individual plate comprises two first channels for conducting media which are formed into the first individual plate, which run next to one another and which are separated from one another at least in sections by a web formed between the first channels.

The second individual plate comprises a second channel for conducting media which is formed into the second individual plate, wherein the web formed between the first channels and the second channel formed into the second individual plate are configured, and arranged, in such a way that a projection of the second channel onto the first individual plate perpendicular to the planar face plane of the first individual plate crosses the web along a crossing region of the web.

The web is lowered in the crossing region of the web, such that the first channels running on either side of the web are fluidically connected by way of the lowered portion of the web. Provision is furthermore made for a rear side of the first individual plate, said rear side facing the second individual plate, in the region of the lowered portion or in a region adjoining the lowered portion, to be connected to a rear side of the base of the second channel, said rear side facing the first individual plate, in the contact zone of the individual plates by means of a welded connection. For example, a rear side of the base of the lowered portion, said rear side facing the second individual plate, may be connected to the rear side of the base of the second channel, said rear side facing the first individual plate, in the contact zone of the individual plates by means of the welded connection.

The welded connection comprises a first end region and a first curved portion, wherein the first curved portion runs, and is curved, in such a way that a virtual straight line running perpendicularly through the first end region intersects the welded connection at least two times. As an alternative or in addition, the welded connection comprises a second end region and a second curved portion, wherein the second curved portion runs, and is curved, in such a way that a virtual second straight line running perpendicularly through the second end region intersects the welded connection at least two times.

Instead of using the formulation according to which a projection of the channels and/or webs of the second individual plate onto the first individual plate crosses the webs and/or the channels of the first individual plate or vice versa, for the sake of simplicity the shorter formulation according to which the channels and/or the webs of the second individual plate cross the webs and/or the channels of the first individual plate or vice versa will be used in some instances in the following text. However, this should be understood to mean that the mutually crossing webs and channels of the two individual plates in each case run in different planes at least in sections, these planes being oriented predominantly parallel to one another.

Due to the fact that the web separating the first channels is lowered at the point where it crosses the second channel and that a rear side of the base of the lowered portion, said rear side facing the second individual plate, is connected to a rear side of the base of the second channel, said rear side facing the first individual plate, in a materially bonded manner, the region in which the two individual plates are or can be connected is increased in size. In this way, there is more space for the mentioned welded connection, as a result of which the latter is larger than in conventional separator plates for stabilization of the separator plate.

In pressure pulsation tests, in which a medium is forced between the individual layers of the separator plate at high and alternating pressure in order to examine the durability of separator plates, it has been shown that a welded connection can develop tears or can even completely tear open in its end regions, that is to say at the start and/or at the end of the welded connection, where the welding tool starts up or shuts down. This tearing open is sometimes also referred to as peeling of the welded connection and often has a negative influence on the service life of the separator plate. The end regions are thus often weak points of the welded connection.

In the context of this document, the end region can be defined by that region of the welded connection at which the welding tool or the welding laser beam is stopped or started. Correspondingly, the end region can be called the shut-down region or start-up region of the welding tool or of the welding laser beam. As a result of the start up or shut down of the welding tool, it is for example possible for the two individual plates to not be completely welded to one another locally in the end region, compared with the rest of the welded connection. As an alternative, the separator plate or one of the two individual plates may be weakened in the end regions of the welded connection due to a locally higher energy density during the welding. Even though it is possible, in principle, to distinguish between the start-up and shut-down region on the basis of the scaling of the weld seam, both are subsumed here under the term end region.

The welding geometry of the separator plate proposed hereby is formed in such a way that a further portion of the welded connection runs next to the end region in question, specifically generally the curved portion which stabilizes or stiffens the end region of the welded connection.

The welded connection is often formed as a continuous welded connection, that is to say without interruptions. In some embodiments, at least one of the end regions and the associated curved portion transition into one another continuously. Provision may for example be made for the first end region to adjoin the first curved portion or to be part of the first curved portion and/or for the second end region to adjoin the second curved portion or to be part of the second curved portion.

In alternative embodiments, the welded connection comprises interruptions, and is thus not formed as a continuous welded connection. In some instances, the welded connection is interrupted in such a way that at least one of the end regions and the associated curved portion are separated from one another and not connected to one another. In these cases, the welded connection therefore has at least two separate welded portions which are spaced apart from one another. The corresponding end region then normally forms part of that portion of the welded connection which comprises a proportion of at least 60% of the length of the welded connection. If the welded connection is interrupted, the welded connection may comprise at most three welded portions which are separate from one another.

It is optionally possible for the first curved portion to at least partially surround the first end region. In this case, the first end region may lie within a region which is enclosed by the first curved portion. It is optionally possible for the second curved portion to at least partially surround the second end region. By way of example, the second end region lies within a region which is enclosed by the second curved portion. As a result of the respective end region being surrounded or enclosed by the curved portion, the respective end region may be stabilized in a satisfactory manner and the aforementioned peeling effects are avoided. In some instances, the first curved region and/or the second curved region have a peripheral angle of at least 160°, of at least 180°, or, for example, of at least 250°. Optionally, the first curved portion and/or the second curved portion are of circular, oval, elliptical, hairpin or spiral shape at least in sections. In some instances, the curved portion in question is composed of a plurality of these basic shapes. In this case, the basic shapes mentioned here of the curved portions may transition into one another.

The welded connection may comprise a middle portion which adjoins the first curved portion and/or the second curved portion. The middle portion is often rectilinear. Instead of a rectilinear middle portion, provision may also be made of a corrugated or non-rectilinear middle portion. It is also possible for at least one portion of the middle portion to be of rectilinear design and for at least one further portion of the middle portion to be of non-rectilinear design. In alternative embodiments, the middle portion may also adjoin the first end region and/or the second end region. In these embodiments, the curved portion in question is often not connected to the end region in question. The middle portion may have a length which is at least 40%, at least 50% or at least 60% of the length of the entire welded connection. The middle portion or a main direction of extent of the middle portion may run parallel to the second channel. The middle portion may be arranged in the crossing region of the web.

Optionally, the first end region and the second end region lie on the same side or on different sides of a virtual straight line running through the middle portion, such as the rectilinear middle portion. In some instances, the welded connection is of mirror symmetrical, rotationally symmetrical or point symmetrical design. Provision may be made for the first end region and/or the second end region to comprise a rectilinear portion or to have a rectilinear profile. The rectilinear portion of the end region in question may run, for example, substantially parallel to the middle portion.

The welded connection is often a laser welded connection. Laser welded connections may be produced in a precise manner. However, the present document is not limited to laser welded connections. The welded connection normally has a shape which is formed in such a way that it can be formed without stoppage or with at most two stoppages of a welding tool and/or welding laser beam.

In order to provide more space for the above-described welding geometry, the first channel and/or the second channel may be modified. This will be described below.

Optionally, the second channel comprises at least one second channel widening in a second region adjoining the crossing region. The contact zone of the individual plates may at least partially extend into the region of the second channel widening. Provision may thus be made for the second individual plate to be connected to the first individual plate in the region of the second channel widening by means of the welded connection. It is optionally possible for the second channel to comprise the mentioned second channel widening on both sides of the crossing region. At least one of the curved portions and/or at least one of the end regions may be arranged in the region of the second channel widening.

In some instances, the second channel comprises, in the crossing region between the second channel widenings, a channel tapering in relation to the channel widenings. Here, the channel tapering may be tapered merely in relation to the channel widenings, and may have a width which corresponds to a width of the channel outside of the channel widenings, e.g. upstream or downstream of the channel widenings.

As an alternative or in addition, at least one of the first channels may comprise a first channel widening in a first region adjoining the crossing region. In this case, the first individual plate may be connected to the second individual plate in the region of the first channel widening by means of the welded connection. For instance, at least one of the curvature portions and/or at least one of the end regions is arranged in the region of the first channel widening.

It should be noted at this juncture that here the indications “first” and “second” used in this document merely number the corresponding elements, without specifying a valuation or an order in terms of presence or priority. It is thus possible for the aforementioned second channel widening to be present independently of a first channel widening and vice versa.

It is optionally possible for each first channel—that is to say each of the two first channels—to comprise the mentioned first channel widening, wherein the two first channel widenings are arranged offset relative to one another in a direction of extent of the first channels. The exact position of the first channel widenings relative to one another is often dependent on a crossing angle at which the first channels and the second channel intersect. In the case of a small crossing angle, for example of between 0° and 45°, the mentioned offset is usually greater than in the case of a large crossing angle, for example of between 45° and 90°.

The mentioned channels are generally delimited by two webs or run between two webs. Provision may be made for at least one of the first channels to be delimited by the mentioned web and a further web, wherein the further web comprises a concave portion for formation of the first channel widening, said concave portion forming a convex portion with respect to the channel; however, in the following text the respective web will be focused on in this regard and concave portions will be discussed throughout.

Further webs of the same individual plate, which are adjacent to the two webs delimiting the respective channel and which delimit further channels, may run in a parallel or mirrored manner or with a reduced curvature compared with the webs delimiting the respective channel. For laterally running channels or webs, the curvature of the channels or webs may increasingly decrease until the channels or webs no longer comprise concave or convex regions. The respective individual plate may comprise additional webs or channels which have a substantially rectilinear profile without convex or concave portions. The additional channels or webs are generally further away from the first channels, second channels or webs than the directly adjacent further channels or webs.

The first channel widening and the second channel widening often at least partially overlap in the contact zone. In this case, the welded connection, for example at least one of the end regions and/or at least one of the curved portions, may be provided in the region of overlap of the mentioned channel widenings.

Each individual plate generally comprises at least one passage opening for passage of a fluid, an electrochemically active region and a distribution or collection region which fluidically connects the passage opening to the electrochemically active region. It is often the case that the first channels are arranged in the distribution or collection region of the first individual plate and the second channel is arranged in the distribution or collection region of the second individual plate.

The above-described separator plate is often called bipolar plate in applications in a fuel cell system.

In a further aspect, an electrochemical system is proposed which comprises a plurality of stacked separator plates or bipolar plates of the type described above.

Exemplary embodiments of the separator plate and of the electrochemical system are illustrated in the figures and will be explained in more detail on the basis of the following description.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Here and in the following text, features which recur in different figures are denoted in each case by the same or similar reference designations.

Figure 1:
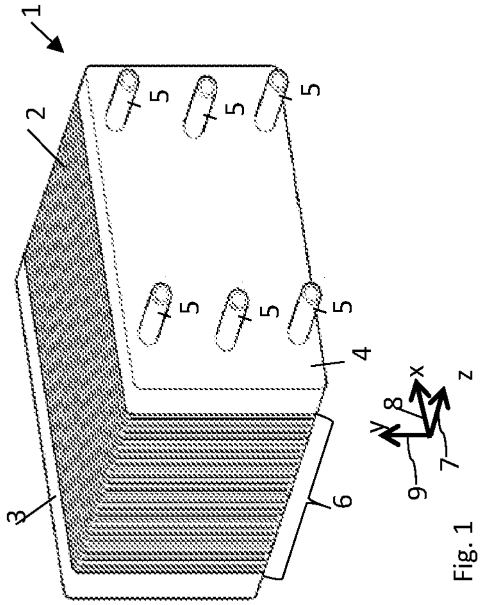
FIG. 1 schematically shows a perspective illustration of an electrochemical system comprising a plurality of separator plates or bipolar plates arranged in a stack.

FIG. 1 shows an electrochemical system 1 comprising a plurality of structurally identical metallic separator plates or bipolar plates 2 which are arranged in a stack 6 and are stacked in a z direction 7. The bipolar plates 2 of the stack 6 are clamped between two end plates 3, 4. The z direction 7 is also called stacking direction. In the present example, the system 1 is a fuel cell stack. In each case two adjacent bipolar plates 2 of the stack enclose between them an electrochemical cell which serves, for example, for conversion of chemical energy into electrical energy. In order to form the electrochemical cells of the system 1, a respective membrane electrode assembly (MEA) is arranged between adjacent bipolar plates 2 of the stack (see for example FIG. 2). The MEAs typically each contain at least one membrane, e.g. an electrolyte membrane. A gas diffusion layer (GDL) may also be arranged on one or both surfaces of the MEA (not illustrated in FIGS. 1 and 2).

In alternative embodiments, the system 1 may equally be in the form of an electrolyzer, an electrochemical compressor or a redox flow battery. In these electrochemical systems, use may likewise be made of separator plates. The construction of these separator plates may then correspond to the construction of the separator plates 2 which are explained in more detail here, even though the media conducted on or through the separator plates in the case of an electrolyzer, in the case of an electrochemical compressor or in the case of a redox flow battery may differ in each case from the media used for a fuel cell system.

The z axis 7 together with an x axis 8 and a y axis 9 defines a right-handed Cartesian coordinate system. The separator plates 2 each define a plate plane, each of the plate planes of the individual plates being oriented parallel to the x-y plane and thus perpendicular to the stacking direction or to the z axis 7. The end plate 4 comprises a plurality of media connections 5, via which media can be fed to the system 1 and via which media can be discharged from the system 1. These media which can be fed to the system 1 and which can be discharged from the system 1 may comprise, for example, fuels such as molecular hydrogen or methanol, reaction gases such as air or oxygen, reaction products such as water vapor, or depleted fuels or coolants such as water and/or glycol.

Figure 2:
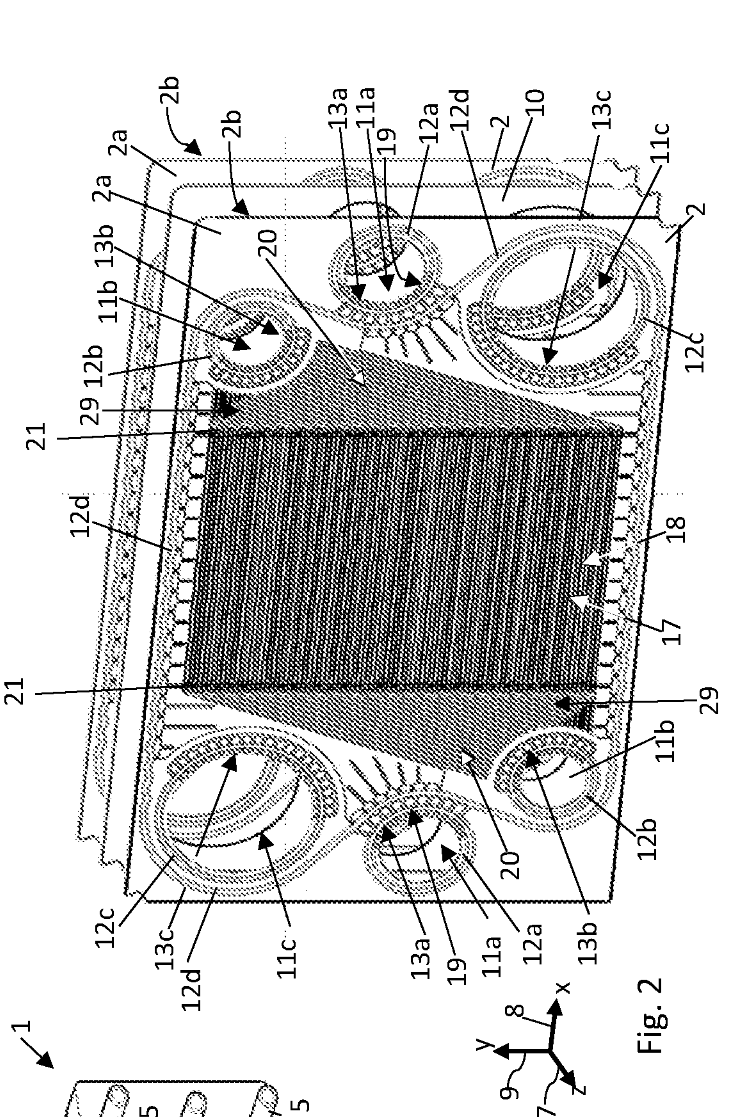
FIG. 2 schematically shows a perspective illustration of two bipolar plates of the system according to FIG. 1 with a membrane electrode assembly (MEA) arranged between the bipolar plates.

FIG. 2 shows, in perspective form, two adjacent separator plates 2 of an electrochemical system of the type of the system 1 of FIG. 1 and a membrane electrode assembly (MEA) 10 known from the prior art, which is arranged between these adjacent separator plates 2, the MEA 10 being largely concealed in FIG. 2 by the separator plate 2 facing the observer. The separator plate 2 is formed from two individual plates 2*a*, 2*b* which are joined together in a materially bonded manner (see for example FIG. 3), of which only the first individual plate 2*a* which faces the observer and which conceals the second individual plate 2*b* is visible in FIG. 2. The individual plates 2*a*, 2*b* may each be manufactured from a metal sheet, e.g. from a stainless steel sheet. The individual plates 2*a*, 2*b* may, for example, be welded to one another, e.g. by laser welded connections.

The individual plates 2*a*, 2*b* comprise passage openings which are aligned with one another and which form passage openings 11*a-c* in the separator plate 2. When a plurality of separator plates of the type of the separator plate 2 are stacked, the passage openings 11*a-c* form lines which extend in the stacking direction 7 through the stack 6 (see FIG. 1). Typically, each of the lines formed by the passage openings 11*a-c* is fluidically connected to one of the ports or media connections 5 in the end plate 4 of the system 1. By way of the lines formed by the passage openings 11*a*, it is possible for e.g. coolant to be introduced into the stack or discharged from the stack. By contrast, the lines formed by the passage openings 11*b*, 11*c* may be configured to supply the electrochemical cells of the fuel cell stack 6 of the system 1 with fuel and with reaction gas and to discharge the reaction products from the stack. The media-conducting passage openings 11*a*-11*c* are substantially parallel to the plate plane.

In order to seal the passage openings 11*a-c* in relation to the interior of the stack 6 and in relation to the environment, the first individual plates 2*a* each comprise sealing arrangements in the form of sealing beads 12*a-c* which are each arranged around the passage openings 11*a-c* and which each completely enclose the passage openings 11*a-c*. The second individual plates 2*b* comprise, on the rear side of the separator plates 2 which faces away from the observer in FIG. 2, corresponding sealing beads for sealing the passage openings 11*a-c* (not shown).

In an electrochemically active region 18, the first individual plates 2*a* comprise, on their front side facing the observer in FIG. 2, a flow field 17 comprising structures for conducting a reaction medium along the front side of the individual plate 2*a*. These structures are provided in FIG. 2 by a plurality of webs and channels which run between the webs and which are delimited by the webs. On the front side of the separator plates 2 which faces the observer in FIG. 2, the first individual plates 2*a* also each comprise a distribution and collection region 20. Distribution or collection regions 20 in each case comprise structures which are configured to distribute a medium introduced proceeding from a first of the two passage openings 11*b* into the distribution region 20 over the active region 18 or to collect or combine a medium flowing proceeding from the active region 18 towards the second of the passage openings 11*b*. The fluid-guiding structures 29 of both distribution or collection regions 20 are likewise provided in FIG. 2 by webs and channels which run between the webs and which are delimited by the webs. In general, the elements 17, 29 can thus be interpreted as media-guiding embossed structures.

The sealing beads 12*a*-12*c* comprise feedthroughs 13*a*-13*c*, which here are embodied in part as local elevations of the bead, of which the feedthroughs 13*a* are embodied both on the bottom side of the upper individual plate 2*a* and on the top side of the lower individual plate 2*b*, while the feedthroughs 13*b* are formed in the upper individual plate 2*a* and the feedthroughs 13*c* are formed in the lower individual plate 2*b*. By way of example, the feedthroughs 13*a* enable passage of coolant between the passage opening 12*a* and the distribution region 20, such that the coolant passes into the distribution region between the separator plates or is conducted out of the collection region 20. Feedthroughs may also be referred to as passages or leadthroughs. Furthermore, the feedthroughs 13*b* enable passage of hydrogen between the passage opening 12*b* and the distribution region on the top side of the upper individual plate 2*a*, these feedthroughs 13*b* are characterized by perforations which face the distribution region and which run obliquely with respect to the plate plane. Thus, for example hydrogen flows through the feedthroughs 13*b* from the passage opening 12*b* to the distribution region on the top side of the upper individual plate 2*a* or in the opposite direction from the collection region. The feedthroughs 13*c* enable passage of for example air between the passage opening 12*c* and the distribution region, such that air passes into the distribution region on the bottom side of the lower individual plate 2*b* or is conducted out of the collection region. The associated perforations are not visible here.

The first individual plates 2*a* also each comprise a further sealing arrangement in the form of a perimeter bead 12*d* which runs around the flow field 17 of the active region 18, the distribution and collection regions 20 and the passage openings 11*b*, 11*c* and seals them in relation to the passage opening 11*a*, e.g. in relation to the coolant circuit, and in relation to the environment of the system 1. The second individual plates 2*b* each comprise corresponding perimeter beads. The structures of the active region 18, the distribution structures of the distribution region and of the collection region 20 and the sealing beads 12*a*-*d* are each formed in one part with the individual plates 2*a* and are each formed into the individual plates 2*a*, e.g. in an embossing or deep-drawing process or by means of hydroforming. The same applies to the corresponding structures of the second individual plates 2*b*.

The two passage openings 11*b* or the lines formed by the passage openings 11*b* through the plate stack of the system 1 are each fluidically connected to one another via feedthroughs 13*b* in the sealing beads 12*b*, via the distribution structures of the distribution or collection region 20 and via the flow field 17 in the active region 18 of the first individual plates 2*a* facing the observer in FIG. 2. Similarly, the two passage openings 11*c* or the lines formed by the passage openings 11*c* through the plate stack of the system 1 are each fluidically connected to one another via corresponding bead feedthroughs, via corresponding distribution and collection structures and via a corresponding flow field on an outer side of the second individual plates 2*b* facing away from the observer in FIG. 2. By contrast, the passage openings 11*a* or the lines formed by the passage openings 11*a* through the plate stack of the system 1 are each fluidically connected to one another via a cavity 19 enclosed by the individual plates 2*a*, 2*b*. This cavity 19 serves in each case for conducting a coolant through the separator plate 2, for example for cooling the electrochemically active region 18 of the separator plate 2.

Figure 3:
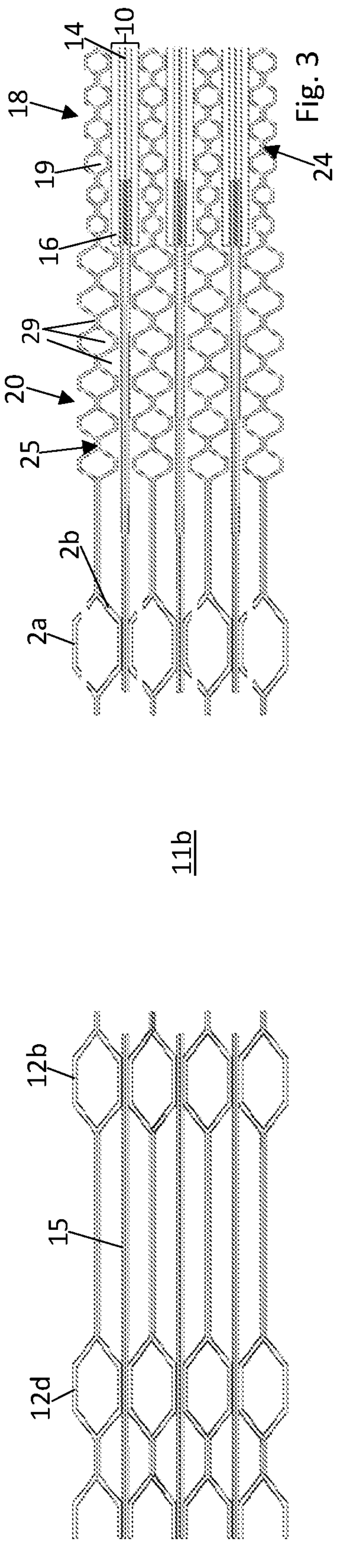
FIG. 3 schematically shows a section through a plate stack of a system in the manner of the system according to FIG. 1.

FIG. 3 schematically shows a section through a portion of the plate stack 6 of the system 1 from FIG. 1, the section plane being oriented in the z direction and thus perpendicular to the plate planes of the separator plates 2. In FIG. 3, the section plane runs along a kinked section, similar to section A-A through FIG. 2 from the publication DE 20 2020 106 144 U1, which is hereby fully incorporated into the present document.

The structurally identical separator plates 2 of the stack each comprise the above-described first metallic individual plate 2*a* and the above-described second metallic individual plate 2*b*. Structures for guiding media along the outer surfaces of the separator plates 2, here for instance in each case in the form of webs and channels delimited by the webs, are apparent. For instance, channels on the surfaces of individual plates 2*a*, 2*b* which adjoin one another, said surfaces being directed away from one another, and cooling channels in the cavity 19 between individual plates 2*a*, 2*b* which adjoin one another are shown. Between the cooling channels, both in the distribution or collection region 20 and in the active region 18, the two individual plates 2*a*, 2*b* lie one on top of the other in a contact region 24 and are connected to one another in said contact region in each case, in the present example by means of laser weld seams. In the following text, the distribution region 20 will be discussed for the sake of simplicity; the corresponding statements can equally apply to a collection region 20.

A respective membrane electrode assembly (MEA) 10 known for example from the prior art is arranged between adjacent separator plates 2 of the stack. The MEA 10 typically comprises in each case a membrane, e.g. an electrolyte membrane, and an edge portion 15 connected to the membrane. By way of example, the edge portion 15 may be connected to the membrane in a materially bonded manner, e.g. by an adhesive connection or by lamination.

The membrane of the MEA 10 extends in each case at least over the active region 18 of the adjoining separator plates 2 and there enables a transfer of protons via or through the membrane. However, the membrane does not reach into the distribution or collection region 20. The edge portion 15 of the MEA 10 serves in each case for positioning, fastening and sealing the membrane between the adjoining separator plates 2.

The edge portion 15 in each case covers the distribution or collection region 20 of the adjoining separator plates 2. In an outward direction, the edge portion 15 may also reach beyond the perimeter bead 12*d* and there adjoin the outer edge region of the individual plates 2*a*, 2*b* (cf. FIG. 2).

Furthermore, gas diffusion layers 16 may additionally be arranged in the active region 18. The gas diffusion layers 16 enable direct flow to the membrane over the greatest possible region of the surface of the membrane and can thus improve the transfer of protons via the membrane. The gas diffusion layers 16 may be arranged, for example, in each case on both sides of the membrane in the active region 18 between the adjoining separator plates 2. The gas diffusion layers 16 may be formed, for example, from a fiber nonwoven or comprise a fiber nonwoven.

Figure 4:
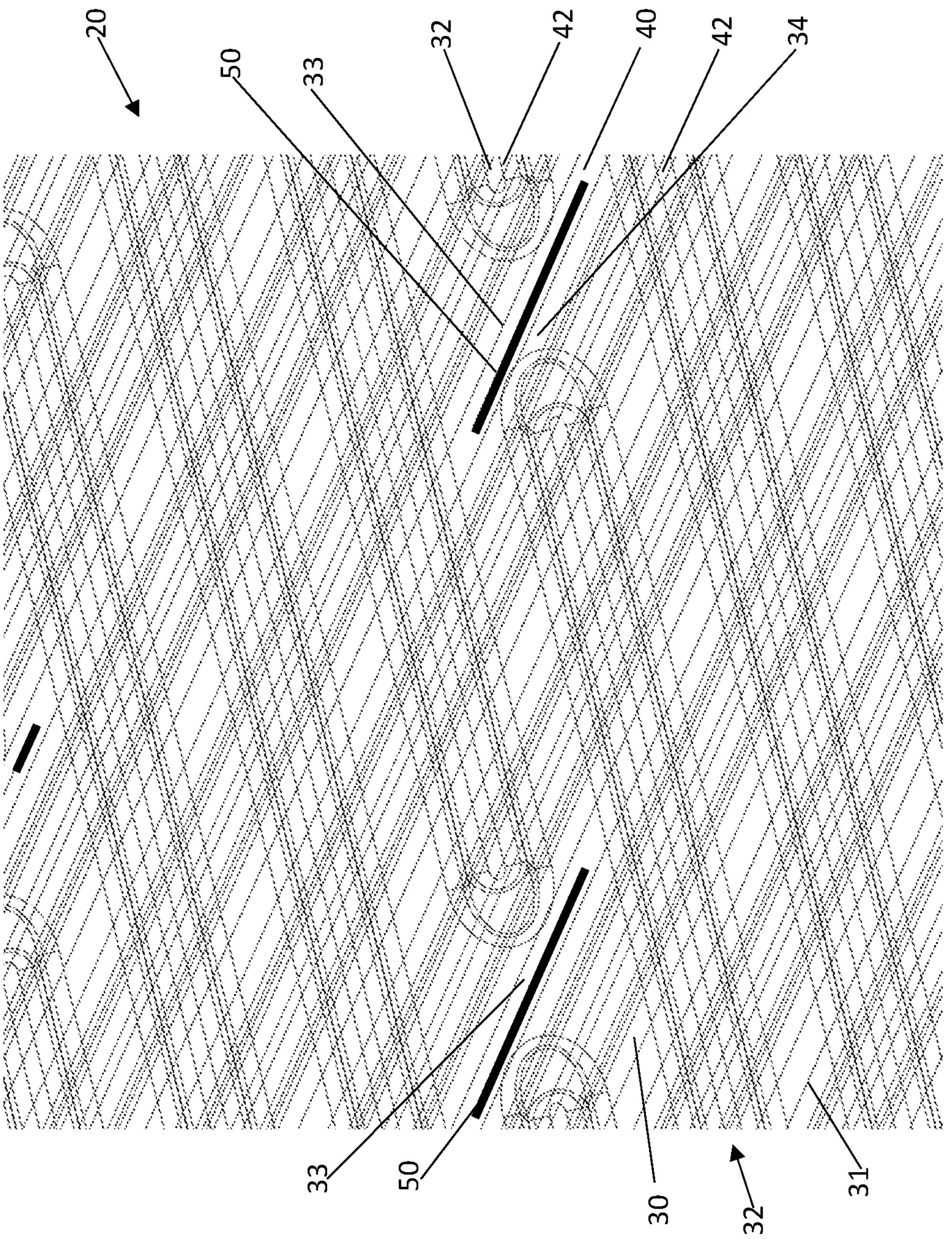
Fig. 4 prior art
FIG. 4 schematically shows a detail of a top view of a collection or distribution region of a separator plate according to the prior art, channels and webs of a rear side of the separator plate being made visible.

Reference is additionally made hereinafter to FIG. 4, in which a portion of the distribution or collection region 20 is shown. The distribution or collection regions 20 of the second individual plate 2*b* and of the first individual plate 2*a* are connected to one another in certain regions along their mutually facing rear sides in a materially bonded manner, here for example by laser welded connections 50. As indicated in FIG. 4, channels 30, 31 and webs 32 of the distribution region 20 of the first individual plate 2*a* and channels 40 and webs 42 of the distribution region 20 of the second individual plate 2*b* run in a crossed manner relative to one another in parallel planes. In the example of FIG. 4, the channels 30, 31 and the webs 32 in the distribution region 20 of the first individual plate 2*a* enclose, with the channels 40 and the webs in the distribution region 20 of the second individual plate 2*b*, for example a crossing angle of for instance between 30° and 40° or between 140° and 150°.

Regions of the webs of the first individual plate 2*a* in which a vertical projection of one of the channels of the second individual plate 2*b* onto the first individual plate 2*a* crosses one of the webs of the first individual plate 2*a* are called crossing regions 33 of the webs 32 of the first individual plate 2*a*. Fully correspondingly, regions of the webs of the second individual plate 2*b* in which a vertical projection of one of the channels 30, 31 of the first individual plate 2*a* onto the second individual plate 2*b* crosses one of the webs of the second individual plate 2*b* are called crossing regions of the webs of the second individual plate 2*b*.

As described in the introduction, a crucial disadvantage of known separator plates 2 is that, in those regions in which the channels of the individual plates 2*a*, 2*b* run in a crossed manner as described here, the individual plates 2*a*, 2*b* of the separator plate 2 can typically be connected only along very small contact regions, specifically precisely at those locations where the mutually facing rear sides of the channel bases of the two individual plates 2*a*, 2*b* cross one another.

In order to solve this problem, the publication WO 2017/029158 A1 proposes increasing the size of the contact regions of the plates 2*a*, 2*b* by virtue of the webs 32 of the first individual plate 2*a*, as shown in FIG. 4 of the present document, being lowered in a lowered region 34 in some of the crossing regions 33 in such a way that in these crossing regions 33 the rear side of the first individual plate 2*a*, said rear side facing the second individual plate 2*b*, is in contact with the rear side of the base of the corresponding channel 40 of the second individual plate 2*b* and is connected thereto in a materially bonded manner, here for example by laser welded connections 50. The contact surfaces along which the rear sides of the individual plates 2*a*, 2*b* are in contact and are or can be connected to one another in the distribution regions 20 can thus be increased in size considerably.

Specifically, the two individual plates 2*a*, 2*b* are or can be connected to one another not only at the locations where the channels 30, 31 of the first individual plate 2*a* and the channels 40 of the second individual plate 2*b* cross one another and their rear sides thus come into contact with one another but additionally in the crossing region 33 of the web 32 between the channels 30, 31 of the first individual plate 2*a*, where the lowered portion 34 of the web 32 provides a larger contact surface between the rear sides of the individual plates 2*a*, 2*b*. This increases the stability of the connection between the individual plates 2*a*, 2*b* and places lower demands on the spatial accuracy of the selected connection technique. The reject rate during the production of the separator plate 2 and the service life of the separator plate 2 in operation can thus be improved.

Due to the fact that the first channels 30, 31 running on either side of the web 32 are fluidically connected by way of the lowered portion 34 of the web 32, the positioning of the lowered portion 34 along the first channels 30, 31 can also be utilized in a targeted manner in order to influence the flow behavior of the media in the first channels 30, 31 and in the intermediate space 19 between the individual plates 2*a*, 2*b*.

In pressure pulsation tests carried out by the applicant, it has been shown, in spite of the above-mentioned measures, that the welded connection 50 can form a weak point of the separator plate 2. If high fluid pressures are acting, the welded connection 50 can in some instances tear open at its start and end points.

The present disclosure has therefore been devised in order to further increase the durability of separator plates 2. For instance, the aim is to achieve a higher lifespan at least with regard to the operation-related pulsation of the pressure of the applied media, for example of the coolant, by way of a geometrical adaptation of the welded connection 50.

In the following text, reference is made to FIGS. 5-10 which show embodiments of the separator plate 2 according to the present disclosure in the distribution or collection region 20. The separator plate 2 comprises a first individual plate 2*a* and a second individual plate 2*b*, which are connected to one another. The two individual plates 2*a*, 2*b* contact one another in a contact zone 25.

Figure 5:
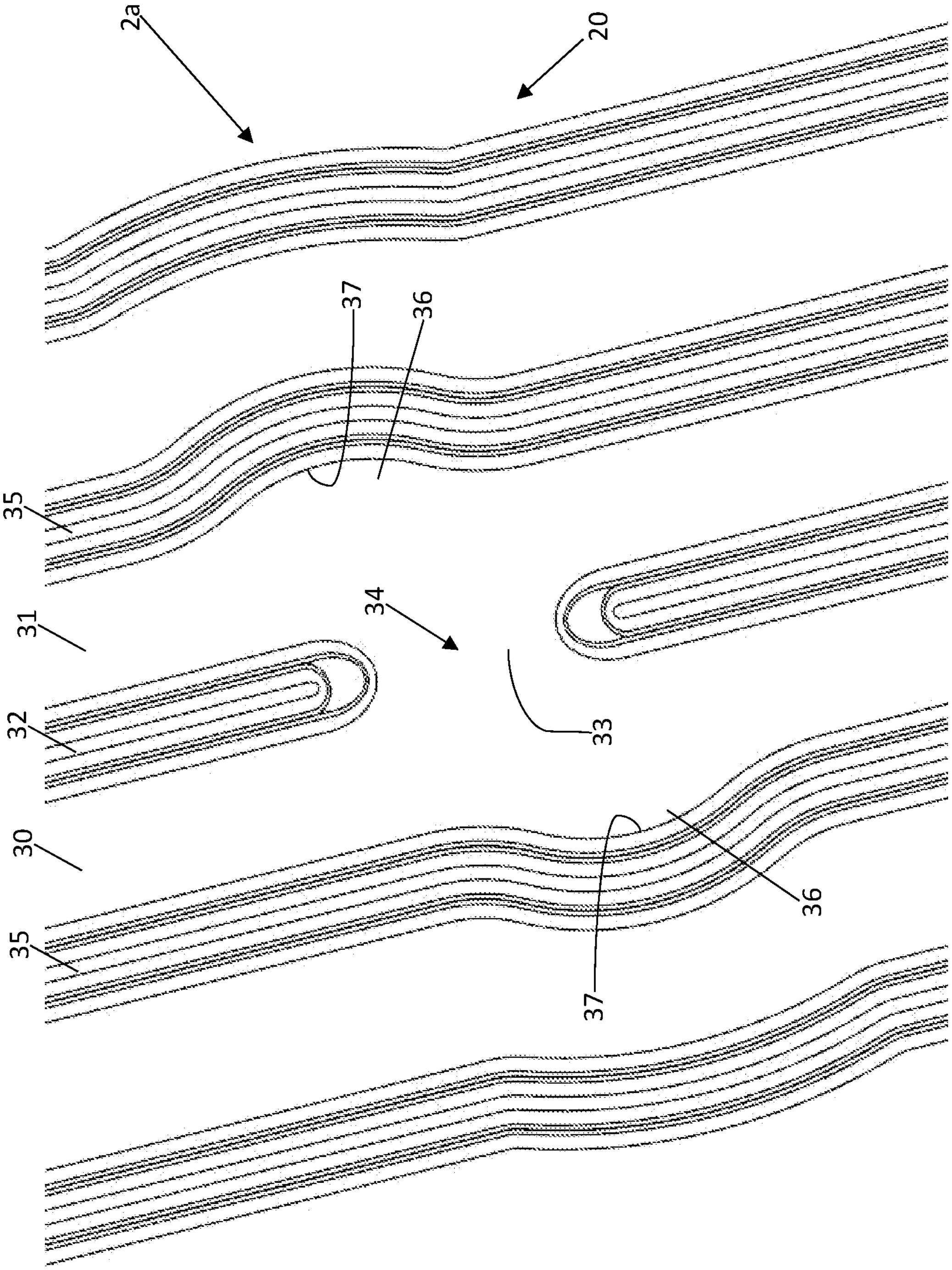
FIG. 5 schematically shows a detail of a top view of a first individual plate.

FIG. 5 shows a detail of a top view of the first individual plate 2*a*. The first individual plate comprises at least two first channels 30, 31 for conducting media which are formed into the first individual plate 2*a* and which run next to one another. The channels 30, 31 are separated from one another at least in sections by a web 32 formed between the first channels 30, 31.

Figure 6:
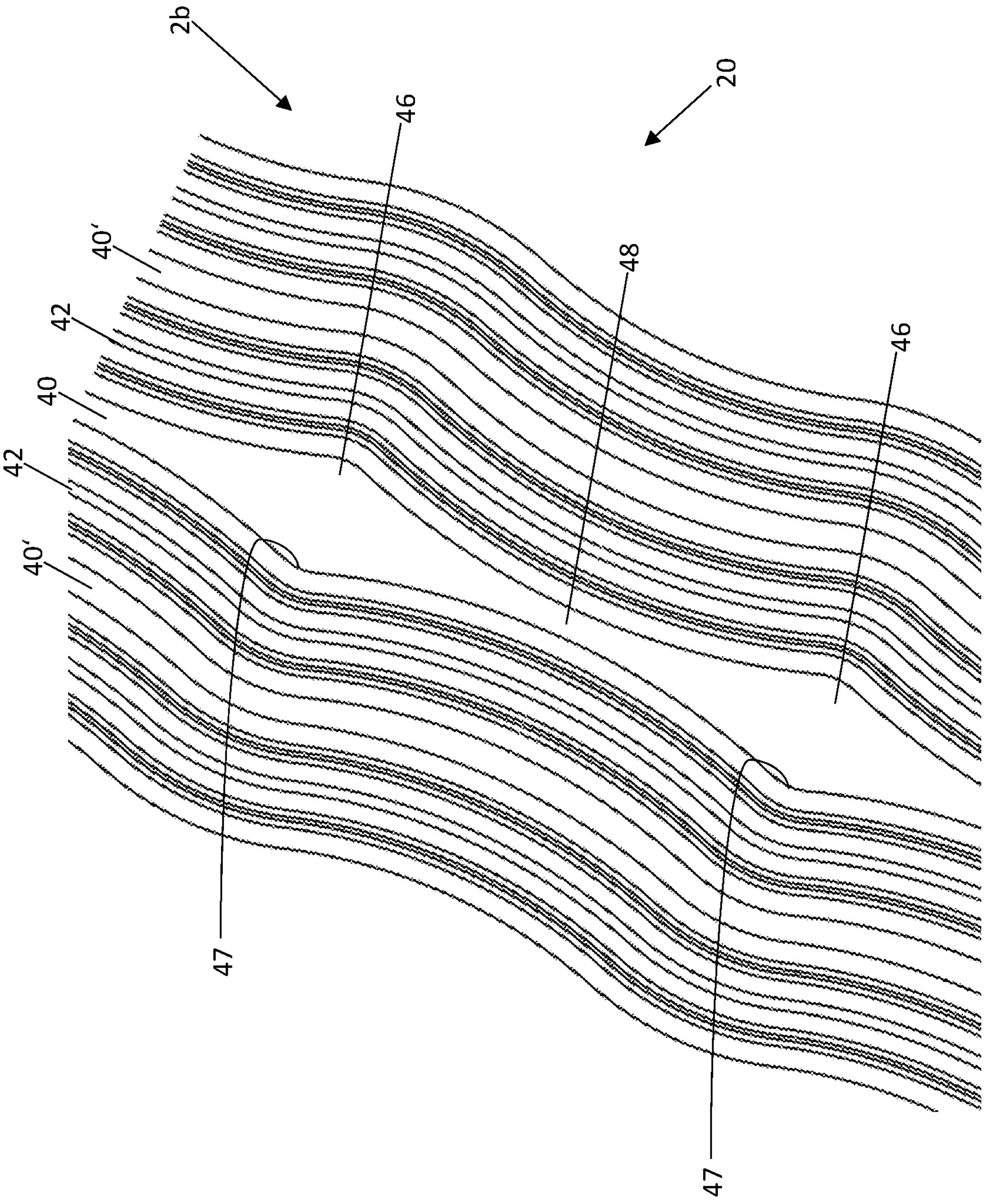
FIG. 6 schematically shows a detail of a top view of a second individual plate.
Figure 7:
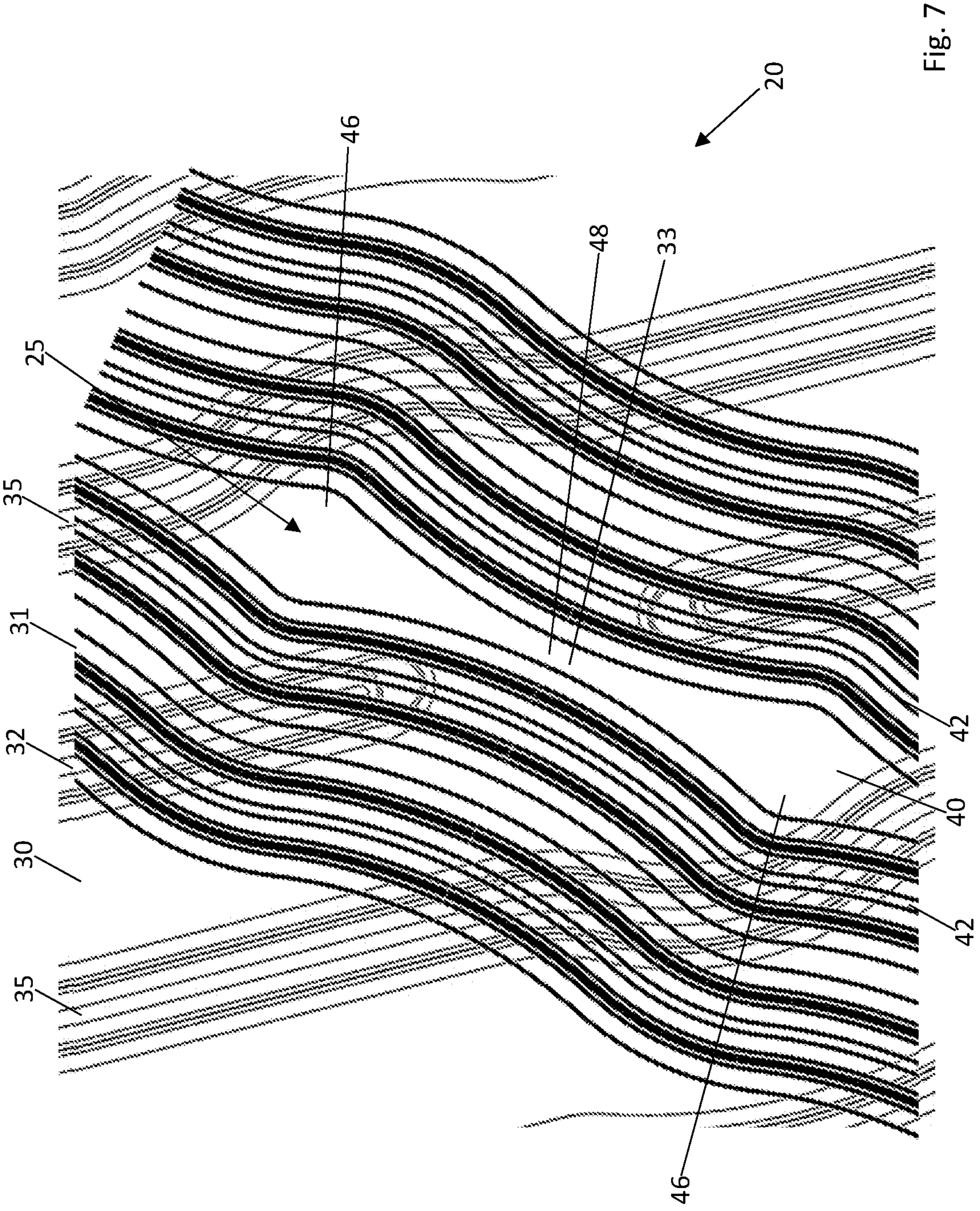
FIG. 7 schematically shows a detail of a top view of a separator plate comprising the first individual plate in FIG. 5 and the second individual plate in FIG. 6, channels of both individual plates being made visible.

FIG. 6 shows a detail of a top view of the second individual plate 2*b*, the detail shown in FIG. 6 and the detail shown in FIG. 5 being placed one on top of the other in the separator plate 2, as illustrated in FIG. 7.

The second individual plate 2*b* comprises a second channel 40 for conducting media which is formed into the second individual plate 2*b*. The second channel 40 is delimited by webs 42 of the second individual plate 2*b*, further channels 40' adjoining said webs.

In order to better understand how and where the channels and webs of the individual plates 2*a*, 2*b* cross, FIG. 7 shows both the second channel 40 and the webs 42 of the upper second plate 2*b* and the first channels 30, 31 and webs 32, 35 of the first plate 2*a* lying therebelow.

The web 32 formed between the first channels 30, 31 and the second channel 40 formed into the second individual plate are configured, and arranged, in such a way that a projection of the second channel 40 onto the first individual plate 2*a* perpendicular to the planar face plane of the first individual plate 2*a* crosses the web 32 along a crossing region 33 of the web 32. The web 32 is lowered in the crossing region 33 of the web 32, such that the first channels 30, 31 running on either side of the web 32 are fluidically connected by way of the lowered portion 34 of the web 32. A rear side of the base of the lowered portion 34, said rear side facing the second individual plate 2*b*, is connected to a rear side of the base of the second channel 40, said rear side facing the first individual plate 2*a*, in the contact zone 25 of the individual plates 2*a*, 2*b* by means of a welded connection 50.

Figure 8A:
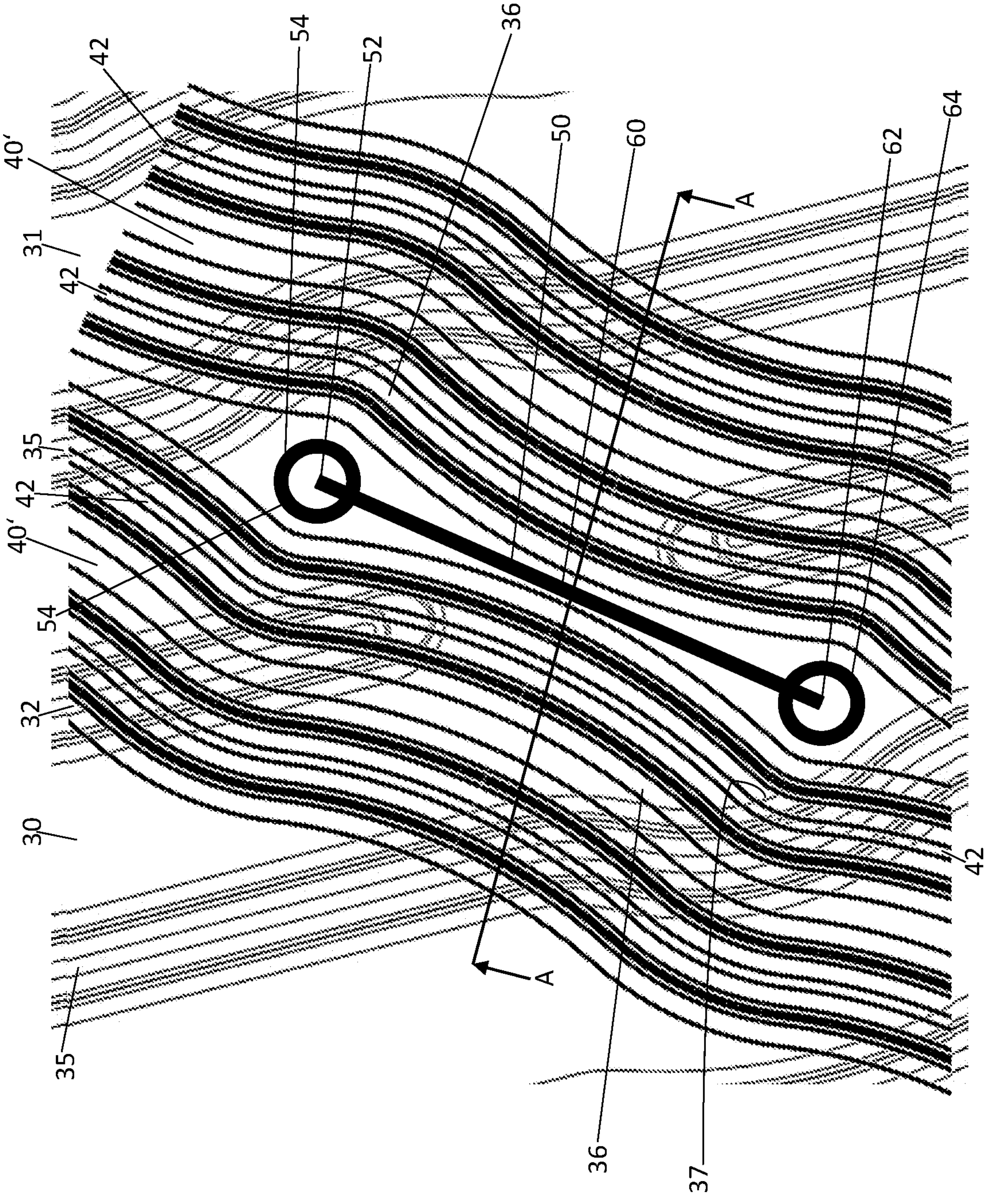
FIG. 8A schematically shows a detail of a top view of a separator plate comprising the first individual plate of FIG. 5 and the second individual plate of FIG. 6, channels of both individual plates being made visible and the first individual plate being connected to the second individual plate by means of a welded connection.

While the welded connection 50 shown in FIG. 4 is rectilinear over its entire profile, the welded connection 50 of the present disclosure has, as shown in FIG. 8A, at least one curved portion 54, 64 which serves for stabilization of the welded connection 50.

Figure 8B:
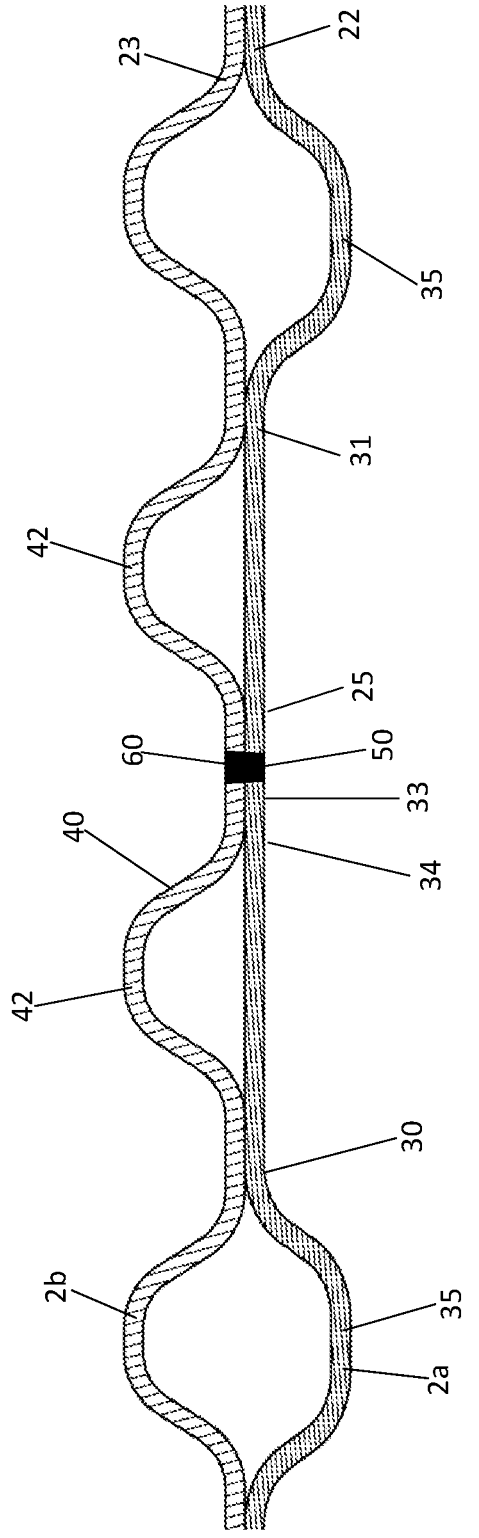
FIG. 8B schematically shows a sectional illustration of the section A-A indicated in FIG. 8A.
Figures 9A, 9B, 9C, 9D, 9E, 9F, 9G, 9H:
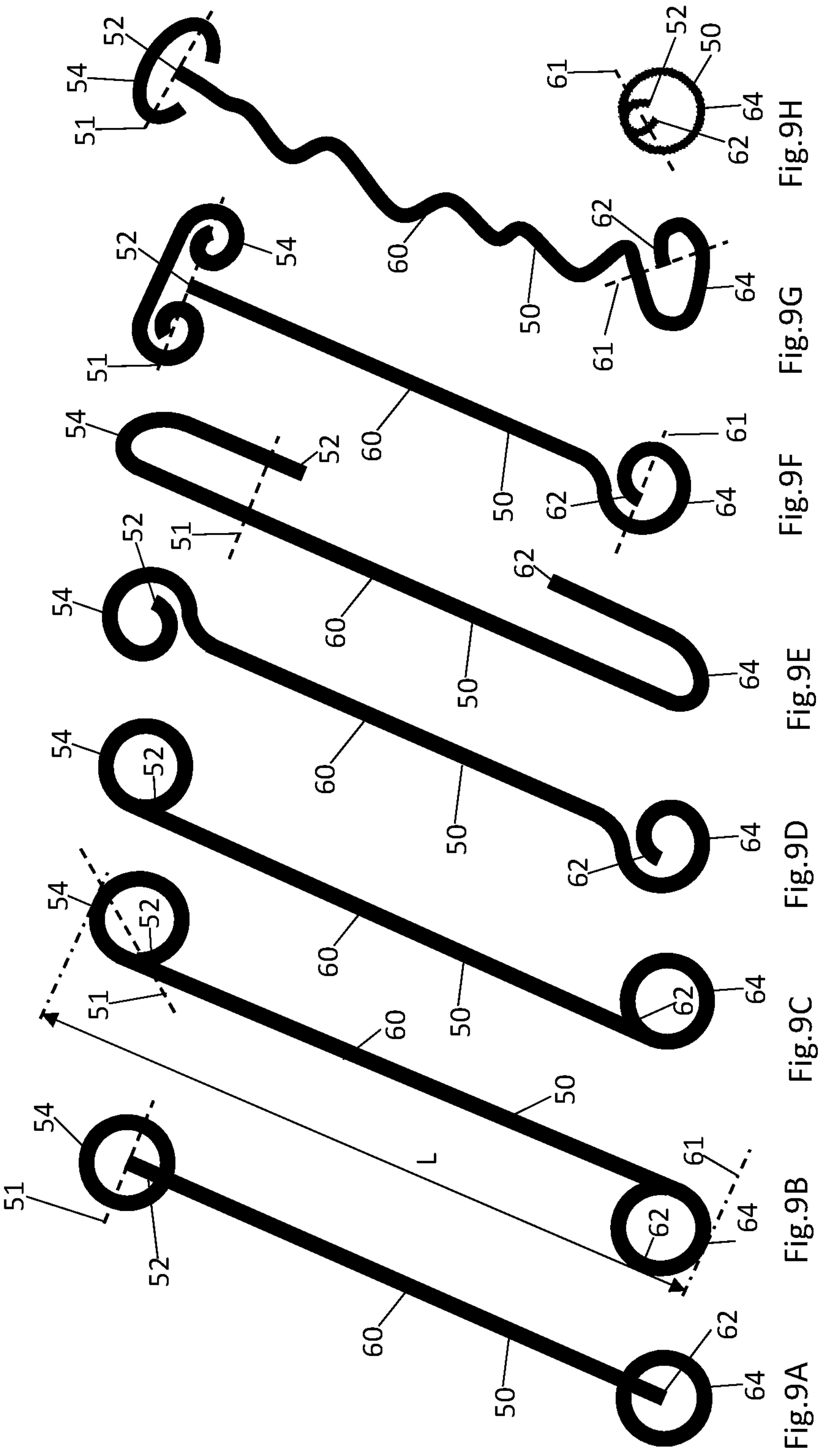
FIGS. 9A-9H show various configurations of a welded connection.

Further details of the welded connection 50 follow in FIGS. 8-10 and the associated description below. It goes without saying that although only the welded connection 50 in FIG. 9A is shown in FIG. 8A, the welded connections 50 in FIGS. 9B-9H can also be combined with the embodiment in FIG. 8A.

Specifically, the welded connection 50 comprises a first end region 52 and a first curved portion 54. The first curved portion 54 runs, and is curved, in such a way that a virtual straight line 51 running perpendicularly through the first end region 52 intersects the welded connection 50 at least two times, for example in the end region 52 and in the region of the first curved portion and/or—here there is normally at maximum one intersection—of a middle portion 60.

As an alternative or in addition, the welded connection 50 comprises a second end region 62 and a second curved portion 64, wherein the second curved portion 64 runs, and is curved, in such a way that a virtual second straight line 61 running perpendicularly through the second end region 62 intersects the welded connection 50 at least two times.

Here, the virtual straight line 51 is an imaginary line which is drawn perpendicularly through the end region 52, 62. Depending on the configuration of the curved region, the welded connection is intersected more or less often by the virtual straight line 51. For instance, the welded connection 50 is intersected two times (FIG. 9E), three times (FIG. 9A, FIG. 9B, FIG. 9C, FIG. 9D, FIG. 9F at the bottom, FIG. 9G), four times (FIG. 9H) or even five times (FIG. 9F at the top). In other words, part of the welded connection 50 runs next to the end region 52, 62, in order to reinforce the latter.

Here, the end region 52, 62 of the welded connection 50 is defined such that it marks the location at which the welding tool has been stopped—the end of a welding step—or started—the start of a welding step. The end region 52, 62 forms, for instance, the end or start point of that part of the welded connection 50 which is of continuous design—that is to say has no interruptions—and the length of which is at least 60% of the welded connection, cf. for example the end regions 52, 62 in FIGS. 9A-9H.

The curved region 54, 64 stiffens the end region 52, 62 locally, as a result of which the end region 52, 62 can be stabilized. At least certain portions of the curved region 54, 64 run transversely with respect to the end region and may also run transversely with respect to the flow direction of the fluid. In this way, instead of a narrow end of the welded connection 50, as shown in FIG. 4, an engagement surface which is widened considerably in relation to the width of the welded connection 50 and which can be peeled open only with considerable difficulty, if at all, by the pressure pulsation in the context of the operation-related pressure fluctuations is produced. Peeling open or tearing of the end region 52, 62 is much less likely as a result.

In some embodiments, the end region 52, 62 adjoins the curved portion 54, 64, cf. FIGS. 9B, 9C, 9D, 9E, 9F at the bottom, 9G at the bottom or 9H. The end region 52, 62 may likewise be curved and may in some instances also be part of the curved portion 54, 64, specifically an end point or start point of the curved portion 54, 64, cf. FIGS. 9B, 9C, 9D, 9F at the bottom, 9G at the bottom, 9H. As an alternative, the end region 52, 62 may also comprise a rectilinear portion or have a rectilinear profile, cf. FIGS. 9A, 9E, 9F at the top, 9G at the top.

In some embodiments, the curved portion 54, 64 at least partially surrounds the end region 52, 62, cf. FIGS. 9A, 9D, 9F, 9G, 9H. Provision may be made for the end region 52, 62 to lie at least partially or completely within a region which is enclosed by the curved portion 54, 64. This is apparent in FIG. 9A. The curved portion may have a peripheral angle of at least 180° (cf. FIG. 9E) or even at least 250° (cf. FIGS. 9A, 9B, 9C, 9D, 9F, 9G and 9H). The curved portion may also describe a closed ring, that is to say a peripheral angle of 360°, cf. FIGS. 9A, 9B, 9C and 9H.

As is clear from FIGS. 9A-9H, different shapes for the curved portion 54, 64 are conceivable: circular (FIGS. 9A-9C), spiral-shaped (FIGS. 9D and 9F), at least partially following the shape of an ellipse (FIG. 9G at the top) or of an oval (not shown) or hairpin-shaped (FIG. 9E).

At least one of the end regions 52, 62 and the associated curved portion 54, 64 may transition into one another by way of a continuous welded portion. In other words, the end region 52, 62 is connected to the curved portion 54, 64, cf. FIGS. 9B, 9C, 9D, 9E, 9F at the bottom, 9G at the bottom and 9H. As an alternative, the welded connection 50 may be interrupted, in such a way that the end region 52 and the associated curved portion 54 are separated from one another and not connected to one another, cf. FIG. 9F at the top and FIG. 9G at the top. In other words, the end region 52 and the curved portion 54 are spaced apart from one another. The minimum spacing between the end region 52 and the curved portion 54 may be, for example, at most 0.5 mm, for instance at most 0.3 mm.

The welded connection 50 may comprise a rectilinear middle portion 60 which adjoins the first curved portion 54 and/or the second curved portion 64, cf. FIGS. 9B, 9C, 9D, 9E, 9F at the bottom. Instead of a rectilinear middle portion 60, it is also possible for a corrugated or non-rectilinear middle portion 60 to be arranged between the two curved portions 54, 64 or to adjoin a curved portion 54, 64, cf. FIG. 9G. It is also possible for at least one portion of the middle portion 60 to be of rectilinear design and for at least one further portion of the middle portion 60 to be of non-rectilinear design, see also FIG. 9G. In alternative embodiments, the middle portion 60 may also directly adjoin the first end region and/or the second end region, cf. FIGS. 9A, 9F at the top and 9G at the top. In the two last-mentioned embodiments, the curved portion 54, 64 in question is not connected to the end region 52, 62 in question. All three embodiments, the welding tool cannot produce the welding line at once without interruption. The middle portion 60 may have a length which is at least 40%, at least 50% or at least 60% of the length of the entire welded connection 50. A length of the middle portion 60 may be, for example, 2.5 mm given a total length of the welded connection 50 of approximately 3.5 mm, the latter not representing the developed length, but rather the extent L. The end region 52, 62, for instance the rectilinear portion thereof, may for example run substantially parallel to the middle portion (see FIG. 9A, FIG. 9E, FIG. 9F at the top, FIG. 9G at the top) and/or form an extension of the middle portion, cf. FIG. 9A, FIG. 9F at the top, FIG. 9G at the top.

In the embodiment in FIG. 9H, there is no middle portion 60 extending parallel to the channel 40. Instead, the end regions 52, 62 are connected to one another directly by way of the curved portions 54, 64.

The welded connection 50 typically has a shape which is formed in such a way that it can be formed without stoppage or with at most two stoppages of a welding tool and/or welding laser beam. The welded connections 50 in FIGS. 9B, 9C, 9D, 9E and 9H can, for example, be drawn continuously, while for the production of the welded connections 50 in FIGS. 9F and 9G, the welding tool has to be stopped once, in order to form the curved portion 52. In the case of the welded connection in FIG. 9A, the welding tool had to be stopped two times.

The curved portions 54, 64 occupy more space in a lateral direction—that is to say transversely with respect to the longitudinal extent of the channel 40—than the rectilinear welding line 50 in FIG. 4. In the cramped conditions of the channels in FIG. 4, this space is not always available, which may have a restricting effect on the geometry of the welded connection 50. It is optionally possible for the channels 30, 31, 40 to be adapted, in terms of their geometry, to the welded connection 50, as a result of which channels 30, 31, 40 and welded connection 50 can be matched to one another. This will be explained on the basis of FIGS. 5-8.

It is apparent in FIG. 5 that the first channels 30, 31 each comprise a first channel widening 36, in order to increase the size of the contact zone 25 of the individual plates 2*a*, 2*b* and to provide space for the welded connection 50, for example the curved portions 54, 64 of the welded connection 50. The respective channel widening 36 comprises a concave portion 37 in a web 35 which is adjacent to the web 32 and which delimits the respective channel 30, 31, the concave portion 37 being able to be formed as a bulge in the web 35. Here, a width of the web 35, measured perpendicularly with respect to the longitudinal extent of the channel 30, 31, can remain substantially constant. Since the second channel 40 extends in an angled manner with respect to the first channels 30, 31, the channel widenings 36 may be arranged offset relative to one another in the longitudinal direction or direction of extent of the channels 30, 31. The first individual plate 2*a* is thus connected to the second individual plate 2*b*, for example to the channel base of the second channel 40, in the region of the first channel widenings 36 by means of the welded connection 50, for example the curved portions 54, 64 of the welded connection.

It is indicated in FIG. 6 that the second channel 40 comprises at least one second channel widening 46 in a second region adjoining the crossing region 33 of the web 32. The channel widening 46 may be formed as a concave portion 47 or concave bulge 47 in the web 42 delimiting the channel 40. The contact zone 25 of the individual plates 2*a*, 2*b* may at least partially extend into the region of the second channel widening 46. Provision may thus be made for the second individual plate 2*b* to be connected to the first individual plate 2*a* in the region of the second channel widening 46 by means of the welded connection 50, for example the curved portions 54, 64. It is optionally possible for the second channel 40 to comprise the mentioned second channel widening 46 on both sides of the crossing region 33, cf. FIGS. 6-8. In some instances, the second channel 40 comprises, in the crossing region 33 between the second channel widenings 46, a channel tapering 48 in relation to the channel widenings 46. Here, the channel tapering 48 may be tapered merely in relation to the channel widenings 46, and may have a width which corresponds to a width of the channel 40 outside of the channel widenings 46.

In FIG. 7, the individual plates 2*a*, 2*b* have been laid one on top of the other, but—for the sake of clarity—have not yet been connected to one another by means of the welded connection 50. FIG. 8A shows the same configuration as FIG. 7, the individual plates 2*a*, 2*b* in FIG. 8A having now been connected to one another in a materially bonded manner by way of the welded connection 50.

The first channel widening 36 and the second channel widening 46 may at least partially overlap in the contact zone 25. In this case, the welded connection 50 may be provided in the region of overlap of the mentioned channel widenings 36, 46.

The middle portion 60 may run substantially parallel to the second channel 40. It is also possible for the middle portion to extend at least between the two channel widenings 46. The middle portion 60 may be provided at least in the lowered region 34 of the web 32. The end region 52, 62 and the curved portion 54, 64 may be arranged in the respective channel bases of the channels 30, 31, 40, and for example in the region of the channel widenings 36, 46.

As is clear from FIG. 9, the welded connection 50 may have one or more axes of symmetry. For instance, the welded connection 50 may be rotationally symmetrical through 180°, (see FIGS. 9A, 9B, 9D) or mirror symmetrical (see FIGS. 9A, 9C, 9E, 9H) or point symmetrical (see FIGS. 9A, 9B, 9D). In some embodiments, the first curved portion 54 and the second curved portion 64 may also be formed so as to not be symmetrical, or not be mirror symmetrical and not be rotationally symmetrical, relative to one another, cf. for example FIGS. 9F and 9G. The end regions 52, 62 may for example lie on the same side (cf. FIGS. 9C, 9E) or on different sides (cf. FIGS. 9B, 9D) of a virtual straight line running through the middle portion 60.

As has already been explained above with reference to FIG. 2, each individual plate 2*a*, 2*b* normally comprises at least one passage opening 11*a*-*c* for passage of a fluid, an electrochemically active region 18 and at least one distribution or collection region 20 which fluidically connects the passage opening 11*a*-*c* to the electrochemically active region 18. It is often the case that the first channels 30, 31 are arranged in the distribution or collection region 20 of the first individual plate 2*a* and the second channel 40 is arranged in the distribution or collection region 20 of the second individual plate 2*b*.

Figure 10:
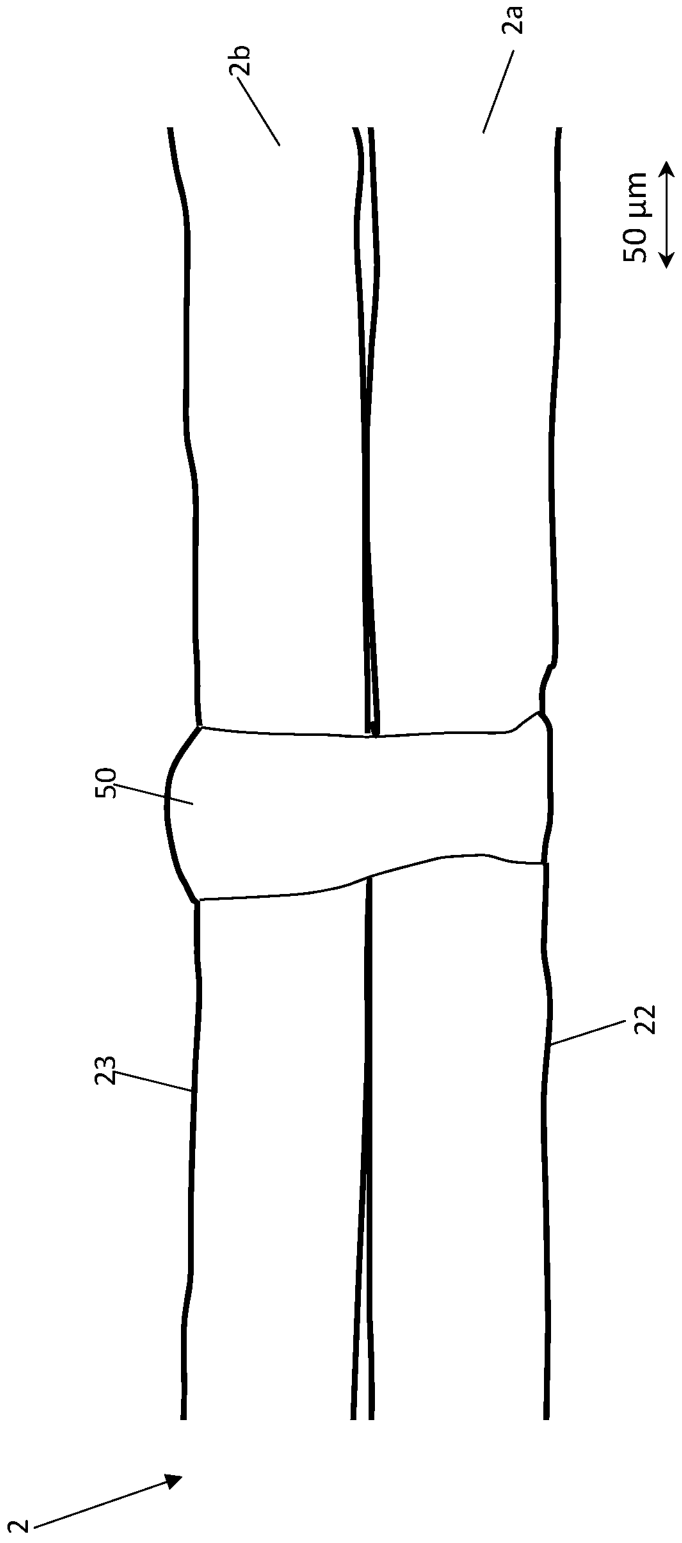
FIG. 10 shows a section through the welded connection of the separator plate of FIG. 8.

FIG. 10 shows a section through the separator plate 2 in the region of an exemplary welded connection 50. It is apparent that the welded connection 50 is visible on both sides of the separator plate 2. The welded connection 50 thus extends from the front side 22 of the first plate 2*a* to the front side 23 of the second plate 2*b*. As an alternative, the welded connection may also be visible only on one of the two front sides 22, 23 and may not extend all the way to the respectively other front side 23, 22. As indicated in FIG. 10, the first individual plate 2*a* and/or the second individual plate 2*b* may have a thickness of at least 50 μm, for instance at least 70 μm. The thickness of the plates may also be at most 200 μm, at most 150 μm, or, for example, at most 100 μm. Given these relatively small thicknesses, it may be that the welded connection 50, as shown in FIG. 10, is in the form of a through-weld.

Figures 11A, 11B, 11C:
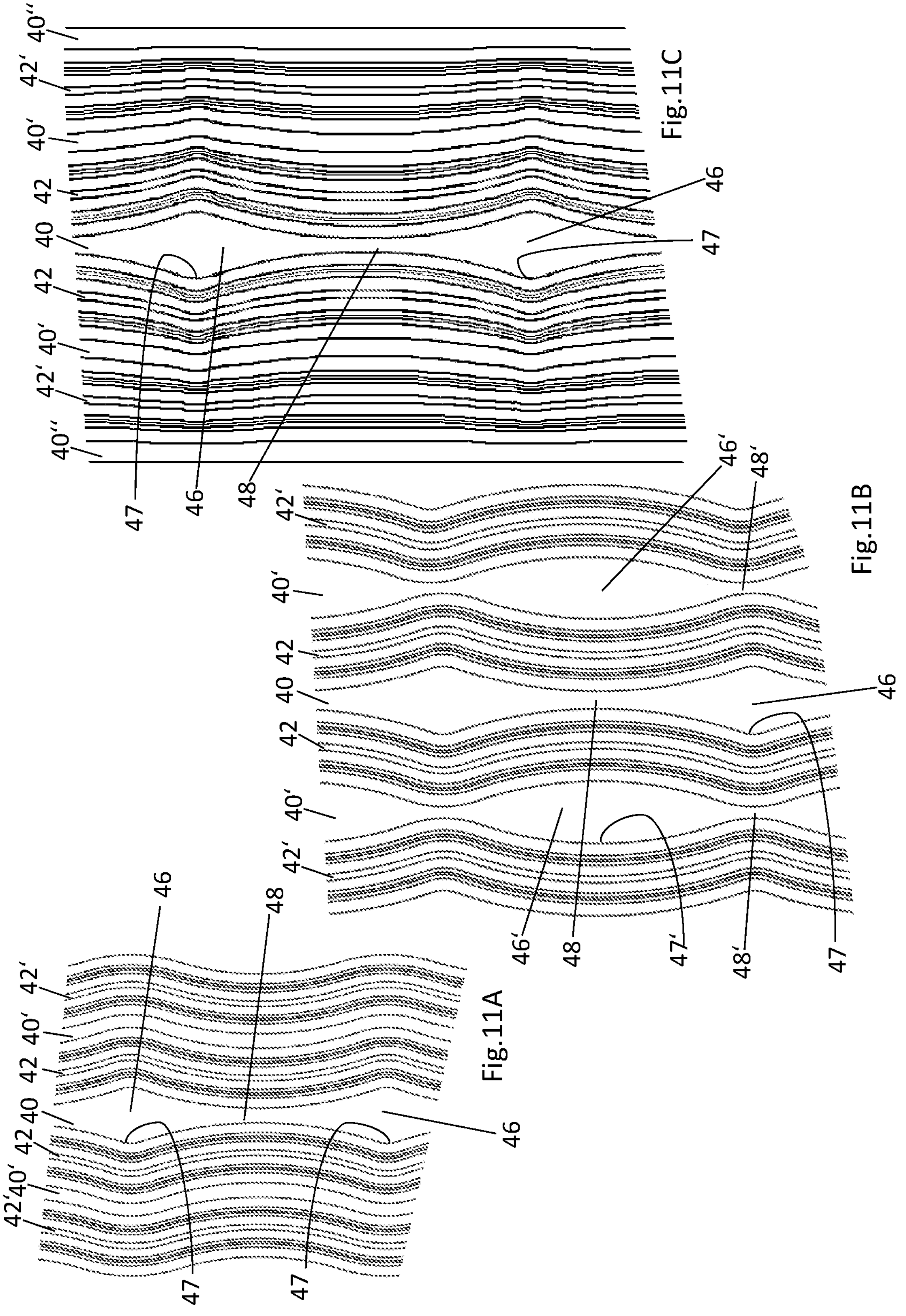
FIGS. 11A-11C shows, a respective detail of a top view of a first individual plate in three variants.

FIG. 11 shows, in three sub-FIGS. 11A-11C, a respective detail of a top view of a first individual plate 2*a* in three variants. Here, reference designations with apostrophes refer to an adjacent channel or web or to the structures belonging to these elements.

The variant in FIG. 11A corresponds to FIG. 5, but has merely been rotated slightly. It is apparent that the channels 40' run substantially parallel to their delimiting webs 42, 42'. The concave and convex curvatures in the webs 42, said curvatures being caused by the channel widening 46 and the tapering 48, thus continue in the further webs 42', and the webs 42, 42' run parallel to one another in pairwise fashion along the channels 40'.

The variant in FIG. 11B shows channel widenings 46, 46' which are arranged offset relative to one another in channels 40, 40' which are adjacent to one another. Here, the channel widening 46 and the channel tapering 48 in the channel 40 give rise to the arrangement of the channel taperings 48' and widenings 46' in the adjacent channels 40', since the concave region 48 in the channel 40, said concave region being induced by the channel widening 46, produces a convex region in the adjacent channel 40' and vice versa. Adjacent webs 42, 42' mirror one another in terms of their profile, the mirror plane running for instance in the middle of the associated channel 40'. It is also apparent that channel bases of the adjacent channels 40' are formed so as to be complementary to the channel base of the second channel 40.

In the variant in FIG. 11C, the curvature produced by the widening 46 or the concave region 47 continues in the adjacent channels 40', 40" and webs 42', but to an increasingly lower extent. It is thus apparent that the directly adjacent channels 40' still have a profile which resembles the profile of the web 42, but with a reduced degree of curvature, while the channels 40" already have an almost rectilinear profile.

It should again be mentioned that the above-described separator plate 2 shown in FIGS. 5-10 is often called bipolar plate in applications in a fuel cell system 1.

In a further aspect, an electrochemical system 1 is proposed, for example in the manner of FIG. 1, which comprises a plurality of stacked separator plates 2 or bipolar plates of the type described here.

It goes without saying that, provided they do not contradict one another, features of the embodiments described above in FIGS. 5-10 can be combined with one another or claimed individually. It should also be noted that the features of the separator plates 2 of the prior art shown in FIGS. 1-4 can be combined with the embodiments in FIGS. 5-10, provided these are not mutually exclusive.

FIGS. 1-11C are shown approximately to scale. FIGS. 1-11C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" or "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A separator plate for an electrochemical system, comprising a first individual plate and a second individual plate which is connected to the first individual plate, wherein the two individual plates contact one another in a contact zone, wherein the first individual plate comprises two first channels for conducting media which are formed into the first individual plate, which run next to one another and which are separated from one another at least in sections, by a web formed between the two first channels;

wherein the second individual plate comprises a second channel for conducting media which is formed into the second individual plate; and wherein the web formed between the two first channels and the second channel formed into the second individual plate are configured and arranged, in such a way that a projection of the second channel onto the first individual plate perpendicular to a planar face plane of the first individual plate crosses the web along a crossing region of the web;

wherein the web is lowered in the crossing region of the web, such that the two first channels running on either side of the web are fluidically connected by way of a lowered portion of the web, and wherein a rear side of a base of the lowered portion, said rear side facing the second individual plate, is connected to a rear side of a base of the second channel, said rear side of the base of the second channel facing the first individual plate, in the contact zone of the two individual plates via a welded connection, wherein the welded connection comprises a first end region and a first curved portion, wherein the first curved portion runs, and is curved, in such a way that a virtual straight line running perpendicularly through the first end region intersects the welded connection at least two times, and/or wherein the welded connection comprises a second end region and a second curved portion, wherein the second curved portion runs, and is curved, in such a way that a virtual second straight line running perpendicularly through the second end region intersects the welded connection at least two times, wherein the second channel comprises at least one second channel widening in a second region adjoining the crossing region, wherein the second individual plate is connected to the first individual plate in the second region of the second channel widening by the welded connection.

2. The separator plate according to claim 1, wherein the first end region adjoins the first curved portion or is part of the first curved portion and/or wherein the second end region adjoins the second curved portion or is part of the second curved portion.

3. The separator plate according to claim 1, wherein the first curved portion at least partially surrounds the first end region and/or wherein the second curved portion at least partially surrounds the second end region.

4. The separator plate according to claim 3, wherein the first end region lies within a region which is enclosed by the first curved portion and/or wherein the second end region lies within a region which is enclosed by the second curved portion.

5. The separator plate according to claim 1, wherein the first end region and/or the second end region comprises a rectilinear portion or has a rectilinear profile.

6. The separator plate according to claim 1, wherein the first curved portion and/or the second curved portion are of circular, oval, elliptical, hairpin or spiral shape at least in sections.

7. The separator plate according to claim 1, wherein the welded connection comprises a rectilinear middle portion which adjoins the first curved portion or the first end portion and/or which adjoins the second end portion or the second curved portion.

8. The separator plate according to claim 1, wherein at least one of the end regions and the associated curved portion transition into one another by way of a continuous welded portion.

9. The separator plate according to claim 1, wherein the welded connection is interrupted, in such a way that at least one of the end regions and the associated curved portion are separated from one another and not connected to one another.

10. The separator plate according to claim 1, wherein each individual plate comprises at least one passage opening for passage of a fluid, an electrochemically active region and a distribution or collection region which fluidically connects the at least one passage opening to the electrochemically active region, wherein the two first channels are arranged in the distribution or collection region of the first individual plate and the second channel is arranged in the distribution or collection region of the second individual plate.

11. The separator plate according to claim 1, wherein the welded connection is a laser welded connection.

12. The separator plate according to claim 1, wherein the welded connection is formed as a continuous welded connection.

13. The separator plate according to claim 1, wherein the welded connection has a shape which is formed in such a way that it can be formed without stoppage or with at most two stoppages of a welding tool and/or welding laser beam.

14. An electrochemical system comprising a plurality of stacked separator plates according to claim 1.

15. A separator plate for an electrochemical system, comprising a first individual plate and a second individual plate which is connected to the first individual plate, wherein the two individual plates contact one another in a contact zone, wherein the first individual plate comprises two first channels for conducting media which are formed into the first individual plate, which run next to one another and which are separated from one another at least in sections, by a web formed between the two first channels;

wherein the second individual plate comprises a second channel for conducting media which is formed into the second individual plate; and wherein the web formed between the two first channels and the second channel formed into the second individual plate are configured and arranged in such a way that a projection of the second channel onto the first individual plate perpendicular to a planar face plane of the first individual plate crosses the web along a crossing region of the web;

wherein the web is lowered in the crossing region of the web, such that the two first channels running on either side of the web are fluidically connected by way of a lowered portion of the web, and wherein a rear side of a base of the lowered portion, said rear side facing the second individual plate, is connected to a rear side of a base of the second channel, said rear side of the base of the second channel facing the first individual plate, in the contact zone of the two individual plates via a welded connection, wherein the welded connection comprises a first end region and a first curved portion, wherein the first curved portion runs, and is curved, in such a way that a virtual straight line running perpendicularly through the first end region intersects the welded connection at least two times, and/or wherein the welded connection comprises a second end region and a second curved portion, wherein the second curved portion runs, and is curved, in such a way that a virtual second straight line running perpendicularly through the second end region intersects the welded connection at least two times, wherein at least one of the two first channels comprises a first channel widening in a first region adjoining the crossing region, wherein the first individual plate is connected to the second individual plate in the first region of the first channel widening by the welded connection.

16. The separator plate according to claim 15, wherein each first channel of the two first channels comprises said first channel widening, wherein the two first channel widenings are arranged offset relative to one another in a direction of extent of the two first channels.

17. The separator plate according to claim 15, wherein at least one of the two first channels is delimited by said web and a further web, wherein the further web comprises a concave portion for formation of the first channel widening.

18. The separator plate according to claim 15, wherein the first channel widening and a second channel widening at least partially overlap in the contact zone, and the welded connection is provided in the region of overlap of said channel widenings.

19. The separator plate according to claim 1, wherein a first channel widening and the second channel widening at least partially overlap in the contact zone, and the welded connection is provided in the region of overlap of said channel widenings.

* * * * *